Patented Mar. 10, 1931

1,795,447

UNITED STATES PATENT OFFICE

WALTER SCHMID, OF PHILADELPHIA, PENNSYLVANIA, ASSIGNOR TO WESTINGHOUSE ELECTRIC & MANUFACTURING COMPANY, A CORPORATION OF PENNSYLVANIA

CONTROL MECHANISM

Application filed January 27, 1930. Serial No. 423,719.

My invention relates to a control mechanism, more particularly to a control mechanism for a prime mover and driven machine set which is normally driven by electric current received from an electric power line and which is to be driven by the prime mover upon failure, or an abnormal condition, of the current received from said line.

An object of my invention is to provide a control mechanism for the apparatus set forth which will provide automatic regulation thereof.

A further object is to provide a control mechanism of the character set forth which will permit the speed of the set to be controlled by the current in the power line over a comparatively wide range, but which operates in response to a predetermined minimum speed to disconnect the set from the power line and to control the prime mover of the set to bring the speed up to normal.

Further objects consist of the further capabilities of regulation of the control mechanism as hereinafter described.

In accordance with my invention, I provide a governing means for the prime mover of the set which is responsive to the speed of the set. The action of the governing means is modified, for example, to shut off the admission to the prime mover, as long as the set is connected with the power line and the speed is above the predetermined minimum speed.

Further means act upon decrease in speed below said predetermined speed to disconnect the set from the line and to discontinue the modification of the action of the governing means, permitting the latter to maintain normal speed of the set.

In accordance with a further aspect of the invention, I provide still further means which operates when the set is again connected to the power line for again modifying the action of the governing means, the speed of the set being again controlled by the current in the power line.

Figure 1:
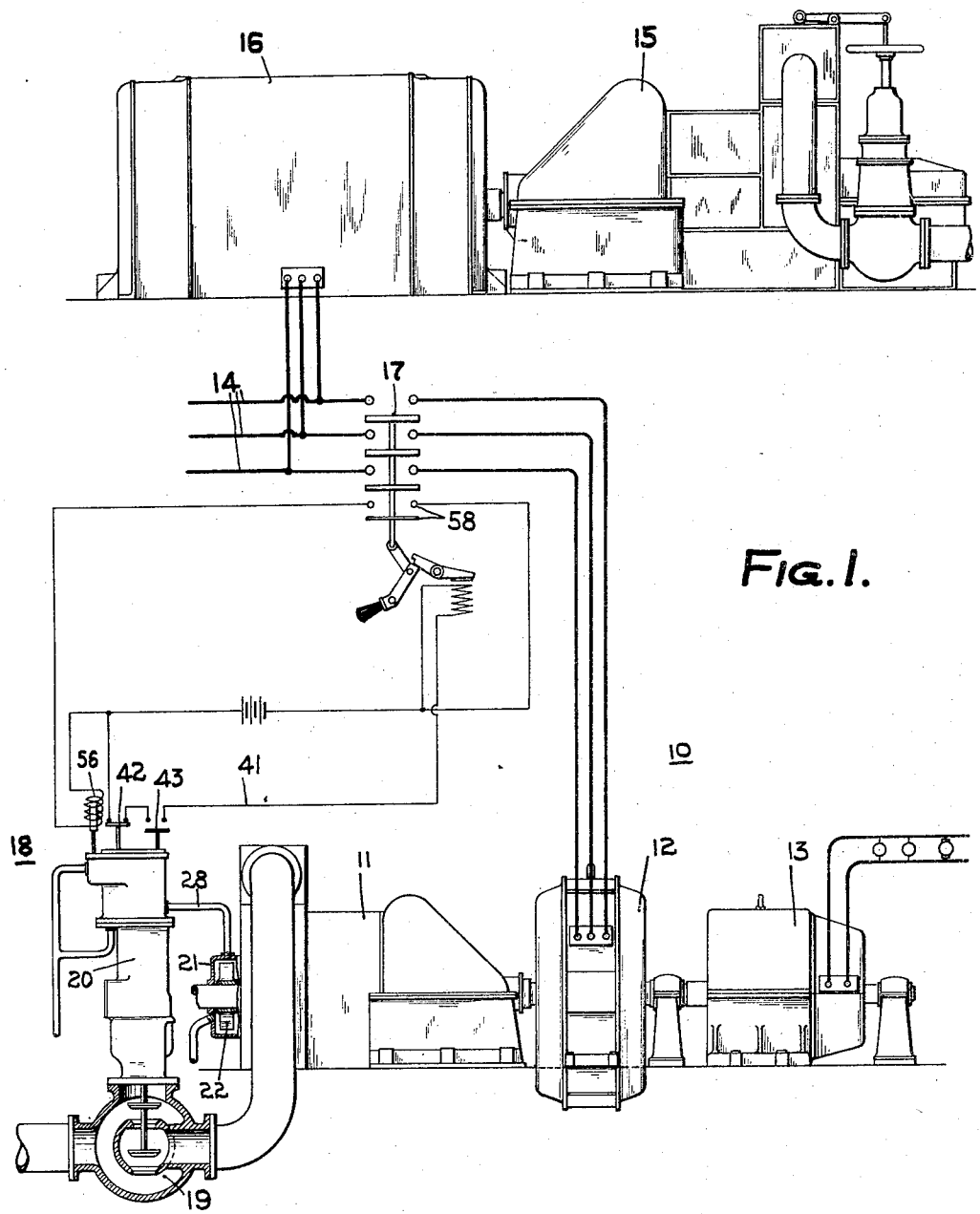
Figure 2:
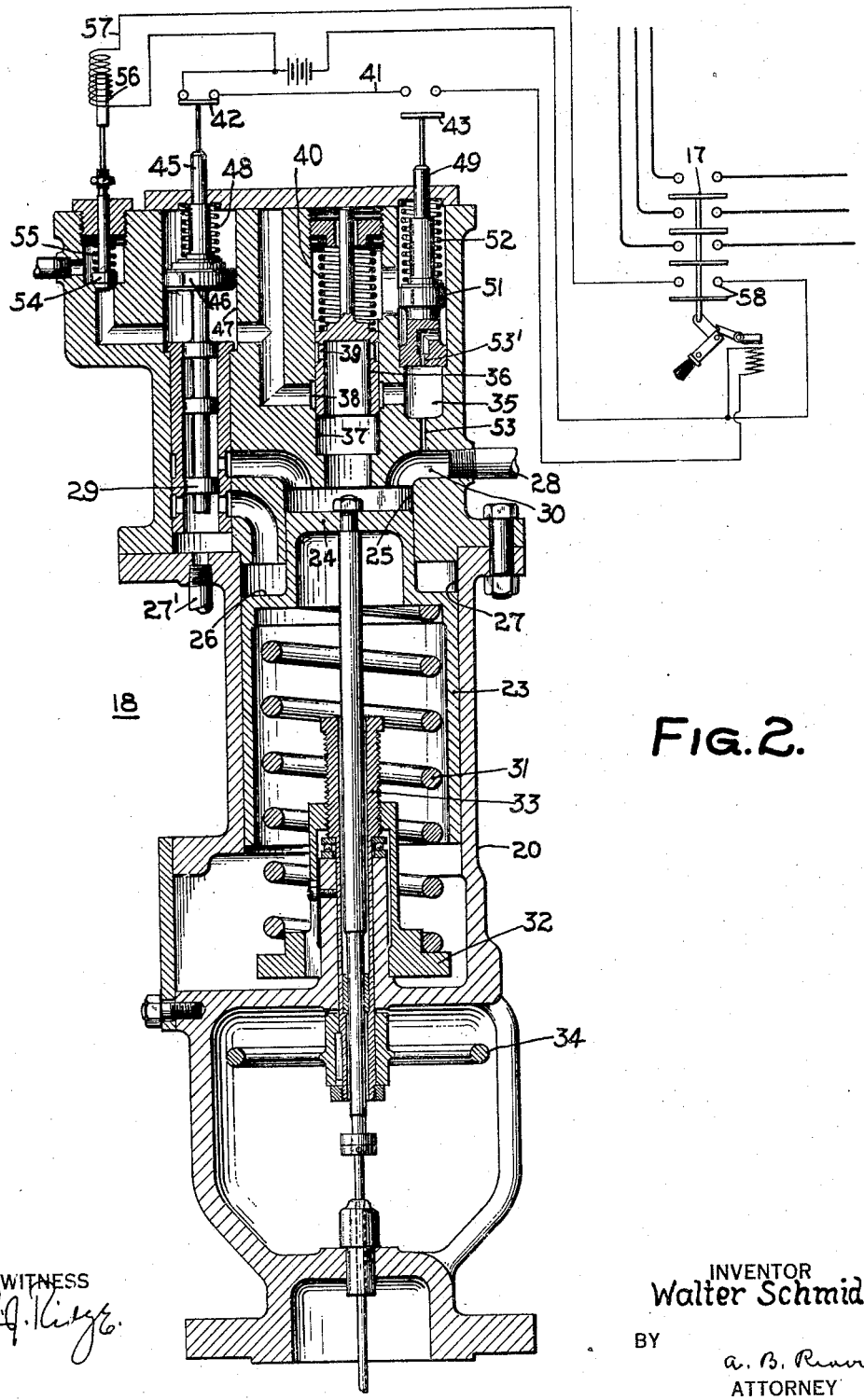

The above objects are effected by my invention, as will be apparent from the following description and claims taken in connection with the accompanying drawings, forming a part of this application, in which:

Fig. 1 is a diagrammatic view of apparatus having my novel control mechanism applied thereto; and Fig. 2 is a detail view of the control mechanism, showing the same partly in section and partly diagrammatically.

Referring now to the drawing more in detail, I show a prime mover set indicated generally by the numeral 10 and including a prime mover comprising a steam turbine 11, a motor for normally driving the set comprising an A. C. motor 12, and a driven machine comprising a D. C. generator 13. My invention is particularly applicable to such a set used in connection with a marine propulsion system, and is so shown and described. The generator 13 supplies current for auxiliary purposes, such as lighting and driving the ship's auxiliaries, and the motor 12 is driven by current generated by the main unit or units, shown as including a prime mover 15 and an A. C. generator 16. The latter delivers A. C. power to an electric power line 14, with which the motor 12 is adapted to be connected by a circuit breaker 17.

Inasmuch as the frequency of the current generated by the main unit varies with changes in speed of the ship, the speed of the prime mover set 10 varies proportionally so long as the circuit breaker 17 is closed. It is desirable that, so far as possible, the prime mover set remain connected with the main unit even though the speed of the main unit may decrease somewhat, the effect of changes in speed on the D. C. generator 13 being compensated by voltage regulation. If the speed of the main unit, however, drops to some abnormally low speed, as for example, about ⅔ of normal speed, the generator 13 can no longer be made to operate satisfactorily, and it is then desirable that the prime mover set 10 be disconnected from the main unit and be driven by the turbine 11. It is further desirable that the turbine operate the set at normal speed.

I have provided, therefore, a control mechanism indicated generally by the numeral 18 for effecting opening of the circuit breaker 17, and for governing of the turbine 11 at normal speed upon abnormally low frequency of the current produced by the main unit. For example, the main unit may normally operate at 60 cycles, and the control mechanism may be designed and set to operate when the frequency drops below 40 cycles per second.

The turbine 11 is provided with an admission valve 19, which regulates the admission of steam or other motive fluid to the turbine. The admission valve 19 is controlled preferably by fluid presure governing means embodied in the control mechanism 18. The governing means illustrated includes a centrifugal pump 21, having an impeller 22 mounted on the shaft of the turbine, and a piston member 23, shown in Fig. 2, connected to the admission valve 19. The impeller develops a fluid pressure varying as the square of the speed of the set, which pressure is herein termed the "impeller pressure".

The piston member 23 has a primary piston portion 24 operating in a cylinder 25, and a secondary piston portion 26 operating in a cylinder 27, both of said cylinders being formed in a housing structure 20, which contains a number of the parts of the control mechanism 18. The fluid pressure developed by the pump 21 is conveyed through a conduit 28 to an inlet 30 in the housing 20, which communicates directly with the cylinder 25. Communication between the inlet 30 and the cylinder 27, however, is controlled by a valve 29, which, in its uppermost position, as shown on the drawing, cuts off such communication, and places the cylinder 27 in communication with a drain conduit 27'.

The force of the fluid pressure on the piston member 23 is opposed by a compression spring 31, which abuts at one end against the piston member and at its other end against a spring-holding member 32. The member 32 is screw-threaded on a sleeve 33, which is adapted to be rotated by a hand wheel 34 to raise or lower the member 32 for changing the setting of the spring 31. In this way, the speed setting of the governor, when effective to govern at normal speed, may be varied.

The area of the primary piston portion 24 and the strength of the spring 31 are such as to govern the prime mover at or about normal speed, that is, the speed at which the set operates when 60 cycle current is delivered to the motor 12. The area of the piston portion 26 is sufficient so that the fluid pressure developed by the pump 21 at any speed down to the speed at which the control mechanism 18 opens the circuit breaker 17, for example, ⅔ of normal speed, provides sufficient force on the piston portions 24 and 26 to overcome the spring 31 and to close the admission valve 19.

The housing structure 20 is formed with an enclosed space designated by the reference numeral 35. Admission of impeller pressure to the space 35 is controlled by a valve member 36 movable in a cylindrical bore 37 in the housing structure. The bore 37 is provided with an annular recess 38, providing communication at all times between the parts of the space 35 on the opposite sides of said bore and forming a part of said space.

The valve member 36 is hollow, the interior being in communication with the fluid pressure inlet 30. It is provided with ports 39, which are adapted in a lower position of the valve to communicate with the recess 38 of the space 35. The valve member 36 is biased upwardly by the impeller pressure, and in opposition thereto by a spring 40. The spring 40 is arranged so that the ports 39 communicate with the recess 38 as the pressure drops below that corresponding to two-thirds of normal speed.

The control mechanism further includes a circuit 41, having two switches 42 and 43 arranged in series in the circuit. The circuit 41 is adapted, when closed, to trip open the circuit breaker 17.

The switch 42 is adapted to be closed by a plunger 45 upon upward movement thereof. The plunger 45 is attached to and operated by a piston 46 to which the valve 29 is also attached. The piston 46 is disposed in a cylinder 47, the lower end of which is a part of the space 35, and hence the piston 46 is biased upwardly by the fluid pressure in said space. A spring 48 biases the piston 46 downwardly in opposition to the fluid pressure.

The switch 43 is similarly adapted to be closed by a plunger 49 upon upward movement thereof. The plunger 49 is attached to a piston 51, which is subjected on its lower face to the pressure in the space 35, and which is biased downwardly in opposition thereto by a spring 52.

The relative strengths of the springs 48 and 52 are so chosen that the piston 46 moves upwardly in response to a lower pressure than the piston 51. For example, the spring 48 may be chosen to permit upward movement of the piston 46 when the pressure in the enclosed space is 15 lbs. per square inch or greater, while the strength of the spring 52 may be chosen to permit upward movement of the piston 51 only when the pressure in the space 35 is 30 lbs. per square inch or greater.

A restricted flow of fluid from the inlet 30 into the enclosed space 35 at all times is provided in any suitable manner, for example, by an orifice 53. A restricted escape at all times of fluid from the space 35 is provided by an orifice 53'.

The space 35 is also provided with a discharge valve 54, which is adapted, when open, to provide a somewhat restricted discharge of fluid from said space. The valve 54 is biased to closed position by a spring 55, and is adapted to be opened by a solenoid 56. The solenoid is included in a circuit 57 and is energized upon completion of said circuit. The circuit 57 includes a switch 58 which is closed when the circuit breaker 17 is closed. When the circuit breaker 17 is closed, therefore, the valve 54 is opened.

The operation of the above described apparatus is as follows:

In normal operation, the circuit breaker 17 is closed and the set is driven by alternating current developed by the generator 16 and transmitted to the motor 12. The valve 54 is held open by the solenoid 56 to permit the escape of the restricted flow of fluid into the space 35 through the orifice 53. There is, therefore, substantially no pressure in the space 35.

The valve 29 is held in its lowermost position by the action of the spring 48 and the impeller pressure acting on the secondary piston portion 26 as well as the primary piston portion 24 holds the admission valve 19 closed and shuts off the admission of motive fluid to the turbine 11. The plungers 45 and 49 are in the lower position, leaving the switches 42 and 43 open. The valve 54 is held open.

This condition exists as long as the frequency of the current developed by the generator and supplied through the power line 14 exceeds 40 cycles, notwithstanding any variation in frequency between 40 and 60 cycles. Should the frequency drop below 40 cycles, however, the speed of the set and the impeller pressure would decrease to such a point that the valve member 36 would be brought into a position in which the ports 39 communicate with the space 35, thereby admitting the impeller pressure into said space.

Assuming the impeller pressure to be 90 lbs. per square inch at normal speed, it is now 40 lbs. per square inch, which pressure in the space 35 effects upward movement of both pistons 46 and 51. The opening provided by the valve 54 is sufficiently small so as not to materially decrease this pressure in the space 35. The switches 42 and 43 are closed by the plungers 45 and 49, thereby effecting opening of the circuit breaker 17, and disconnecting the set from the electric power line 14.

The upward movement of the valve 29 with the piston 46 places the cylinder 27 in communication with the drain conduit instead of the impeller pressure. The low impeller pressure acting on the primary piston portion 24 is readily overcome by the spring 31, and the admission valve 19 is opened wide. The speed of the set increases until it attains normal speed, or, more accurately, a speed within the governing range of normal speed, when the impeller pressure is sufficient to balance the spring 31.

The opening of the circuit breaker at the same time opens the switch 58, de-energizing the solenoid 56 and closing the valve 54. As the opening of the admission valve brings up the speed of the set, the increasing impeller pressure raises the valve member 36 to cut off further admission through the ports 39. There is then a restricted flow of fluid into the space 35 through the orifice 53, and a restricted escape through the orifice 53'; the escape through the valve 54 having been cut off by closing of the valve. The orifices 53 and 53' are so proportioned as to provide as the turbine approaches normal speed, a pressure in the space 35 which is between the pressures at which the pistons 46 and 51 operate, for example 20 lbs. per square inch.

The piston 46 is held in its upper position by the fluid pressure in the space 35, holding the valve 29 in its upper position and rendering the fluid pressure governing means effective to maintain the normal speed of the set. The piston 51 is in lowermost position, opening the switch 43, for the purpose of rendering the circuit breaker 17 capable of being closed as by manual operation. The set 10 is now driven by the turbine 11, the parts of the control mechanism being in the positions shown on the drawing.

The set 10 continues to operate in this manner until such time as the frequency of the main unit is again above 40 cycles and the circuit breaker 17 is again closed, preferably manually. When it is so closed, the solenoid 56 is again energized and the valve 54 is opened. The latter provides sufficient discharge opening from the space 37 to effect a decrease in pressure sufficient to lower the piston 46. The latter moves the valve 29 to admit the impeller pressure to the cylinder 27, controlling the piston member 23 to effect complete closing of the admission valve 19. The set continues in its normal operation, driven by the main unit, as first described.

From the above description, it will be seen that I have provided a control mechanism for a set of the character set forth which permits the set to remain connected to the main unit during a predetermined range of speed variation, but which disconnects the set and effects operation at normal speed thereof, upon an excessive drop in speed of the main unit. Furthermore, a reconnection of the set with the main unit automatically shuts down the prime mover of the set.

While I have shown my invention in but one form, it will be obvious to those skilled in the art that it is not so limited, but is susceptible of various changes and modifications without departing from the spirit thereof, and I desire, therefore, that only such limitations shall be placed thereupon as are imposed by the prior art or as are specifically set forth in the appended claims.

What I claim is:

1. The combination with a prime mover set comprising a prime mover and an electric machine coupled thereto and adapted to be connected with an electric power line, of a control mechanism for the prime mover comprising governing means responsive to the speed of the set for controlling the admission of motive fluid of the prime mover, said governing means being normally effective to shut off said admission, means responsive to an abnormal condition of the electric current in said power line for disconnecting said electric machine from said power line and for rendering the governing means effective to govern the prime mover at its normal speed, and for again rendering the first-mentioned means effective to shut off admission of motive fluid to the prime mover upon restoring the connection of the electric machine with the power line.

2. The combination with a prime mover set comprising a prime mover and an electric machine coupled thereto and adapted to be connected with an electric power line, of a control mechanism for the prime mover comprising governing means responsive to the speed of the set for controlling the admission of motive fluid to the prime mover, said governing means being effective in the normal operation of the set to shut off said admission, means responsive to a predetermined minimum speed of the set for disconnecting the electric machine from said power line and for rendering the governing means effective to bring the speed of the set up to normal, and means operative when the speed of the set is above said predetermined minimum speed and in response to restoring the electric connection of the electric machine with the power line for again rendering the governing means effective to shut off the admission of motive fluid to the prime mover.

3. The combination with a prime mover set comprising a prime mover and an electric machine coupled thereto and adapted to be connected with an electric power line, of a control mechanism for the prime mover comprising governing means responsive to the speed of the set for controlling the admission of motive fluid to the prime mover, means for normally modifying the action of said governing means, means responsive to an abnormal condition of the electric current in said power line for disconnecting said electric machine from said power line and for rendering the modifying means ineffective and the governing means effective to control the admission of motive fluid to the prime mover to maintain the speed thereof substantially at normal speed, and operative to again render the modifying means effective to modify the action of the governing means when the connection of the electric machine with the power line is restored.

4. The combination with a prime mover set comprising a prime mover and an electric machine coupled thereto and adapted to be connected with an electric power line, of a control mechanism for the prime mover comprising governing means responsive to the speed of the set for controlling the admission of motive fluid to the prime mover, means for normally modifying the action of said governing means and means responsive to a predetermined minimum speed of the set for disconnecting said electric machine from said power line and for rendering the modifying means ineffective and the governing means effective to control the admission of motive fluid to the prime mover to maintain the speed thereof substantially at normal speed, and means operative when the speed of the set is above said predetermined minimum speed and in response to restoring the electric connection of the electric machine with the power line for again rendering the modifying means effective to modify the action of the governing means.

5. The combination with a prime mover set comprising a prime mover, an alternating current machine coupled thereto, means including a circut breaker for connecting the alternating current machine with an alternating current power line, said circuit breaker being adapted to be tripped open and to be closed and reset under manual control, of a control mechanism for the prime mover comprising governing means responsive to the speed of the set for controlling the admission of motive fluid to the prime mover, means for normally modifying the action of said governing means, means responsive to a predetermined minimum speed of the set for tripping the circuit breaker open and for rendering the modifying means ineffective and the governing means effective to control the admission of motive fluid to the prime mover to maintain the speed thereof substantially at normal speed, said last-named means permitting the circuit breaker to be closed and reset when the speed of the set is above said predetermined minimum speed, and means operative upon closing of the circuit breaker for rendering the modifying means again effective to modify the action of the governing means.

6. The combination with a prime mover connected with another source of power which normally controls the speed thereof, of means for controlling the admission of motive fluid to the prime mover comprising an admission valve, means providing a fluid pressure varying with the speed of the prime mover, a pressure-responsive element controlling the admission valve, a spring biasing said element in the direction for opening the admission valve, means for applying said fluid pressure to the pressure-responsive element in opposition to the spring and on an area of surface thereof providing governing at a desired speed, means for applying fluid pressure to an additional area of surface of the piston in opposition to the spring for effecting closing of the admission valve, and means responsive to an abnormal operating condition of the prime mover for releasing the fluid pressure on said additional area to permit admission of motive fluid to the prime mover to operate the same at said desired speed.

In testimony whereof, I have hereunto subscribed my name this 22nd day of January, 1930.

WALTER SCHMID.